UNITED STATES PATENT OFFICE.

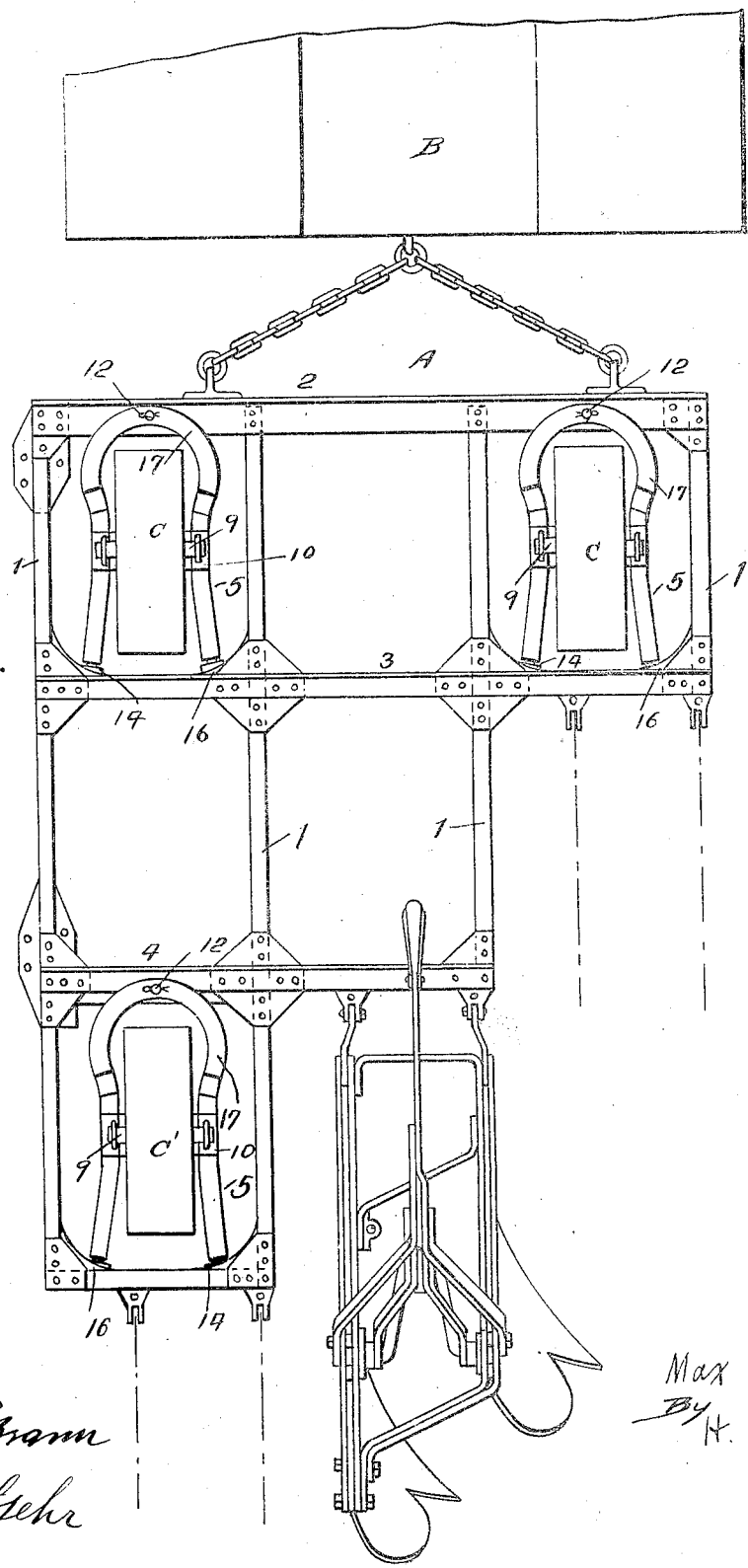

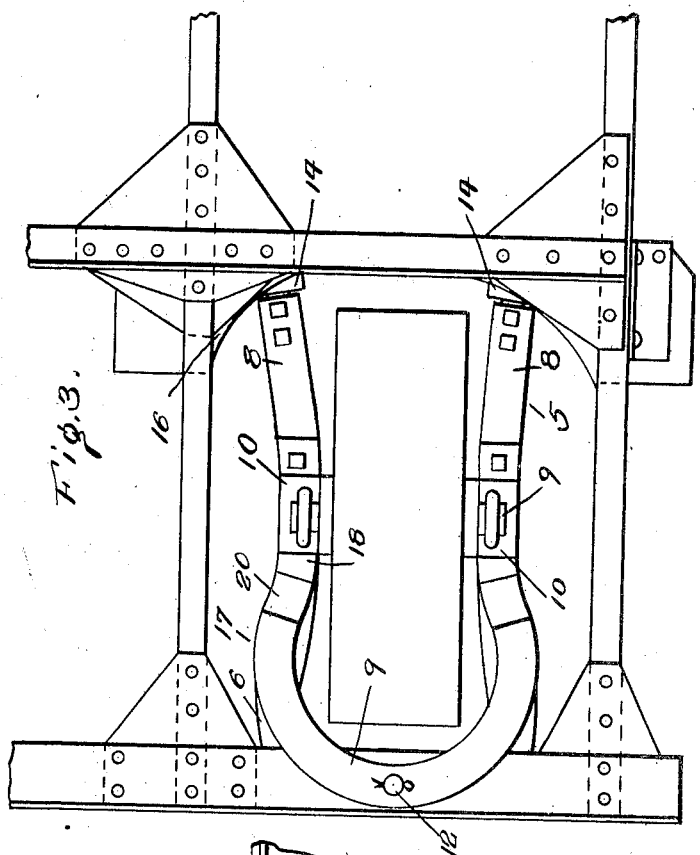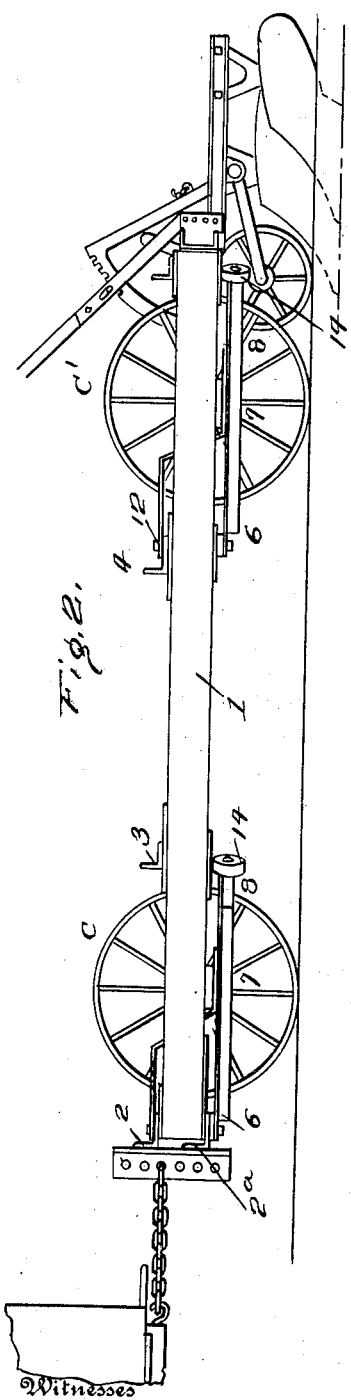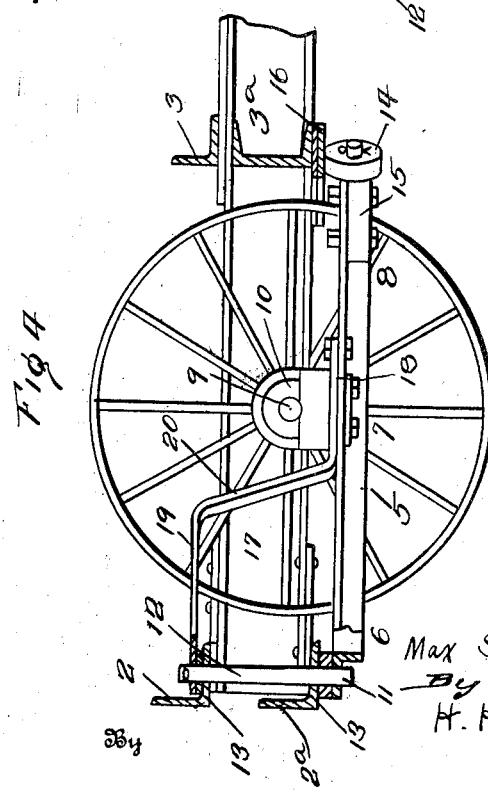

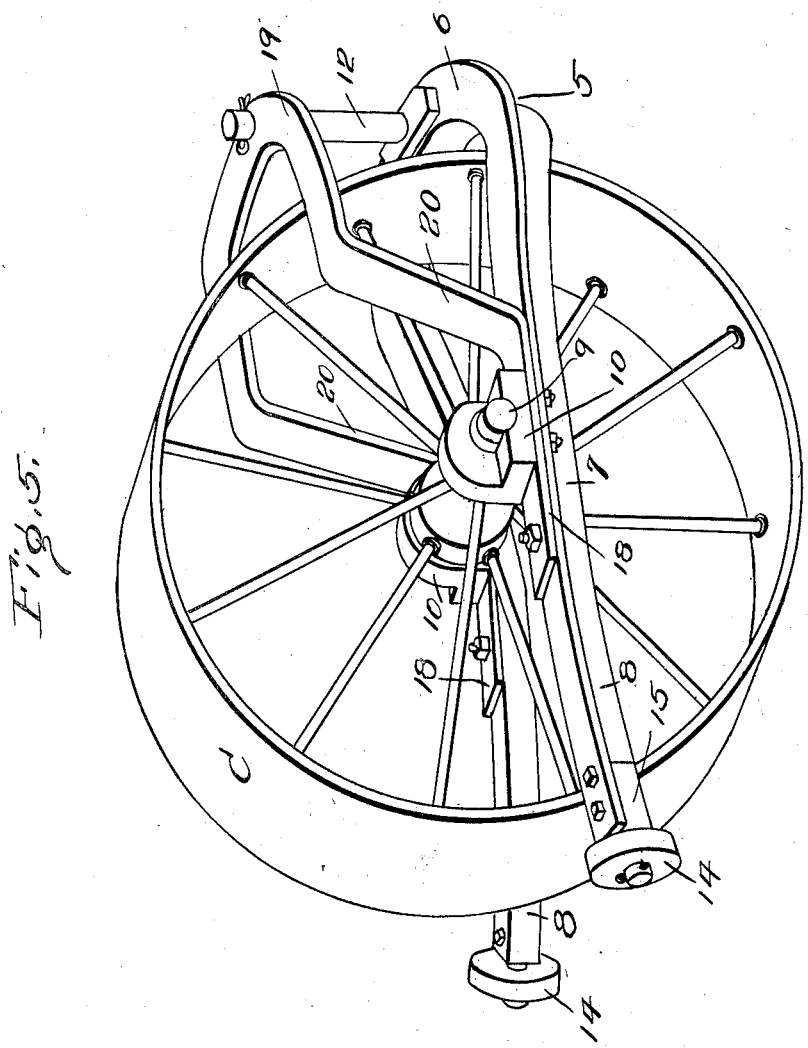

MAX SKLOVSKY, OF MOLINE, ILLINOIS, ASSIGNOR TO DEERE & COMPANY, A CORPORATION OF ILLINOIS.

GANG-PLOW.

1,056,713.  Specification of Letters Patent.  Patented Mar. 18, 1913.

Application filed April 7, 1909. Serial No. 488,413.

*To all whom it may concern:*

Be it known that I, MAX SKLOVSKY, a citizen of the United States, residing at Moline, in the county of Rock Island and State of Illinois, have invented certain new and useful Improvements in Gang-Plows, of which the following is a specification, reference being had therein to the accompanying drawing.

This invention relates to improvements in gang plows, particularly plows of the class known as engine gang plows, that is plowing mechanisms in which a comparatively large number of plow bottoms are drawn by a plow frame which in turn is connected to a tractor such as a traction engine.

The object of the invention is to provide the gang frame, to which the plows are attached, with laterally movable supporting wheels, such as caster wheels, and mount them in such way that they shall be held uniformly in proper relation to the gang frame and yet be permitted to swing or vibrate freely in relation to the frame.

The invention will be fully understood from the devices illustrated in the drawings and the description thereof below set forth.

Figure 1 is a plan view of part of an engine plowing mechanism sufficient to illustrate one of the ways of embodying my improvements. Fig. 2 is a side view. Fig. 3 is a plan view of one of the wheels of the plow frame, and of some of the parts adjacent thereto. Fig. 4 is a side view of the wheel and the devices for mounting it, and showing part of the frame in section. Fig. 5 is a perspective of the wheel and its mounting.

Inasmuch as the present improvements relate principally to the wheels and the mountings therefor which are combined directly with the plow frame, it is not necessary to illustrate or describe in detail the frame work proper or the other parts of the plow mechanism, as an entirety, it being understood that the wheels and their mounting devices are adapted for use in connection with plows differing in their details from that indicated herein. It is sufficient to note that the plow frame, as a whole, is indicated by A and that it is flexibly connected, for example, to an engine as indicated at B. As to the plowing units flexibly connected to the main frame, it will be understood that the showing in the drawings of one of these units is intended to be merely conventional and not necessarily to accurately represent such a plowing unit in all of its details.

The frame is shown as comprising a set of longitudinal bars 1—1, together with suitable cross bars 2, 2$^a$, 3, 3$^a$, etc. These are so shaped and secured together as to provide a structure which is approximately triangular in plan outline. At suitable places near the corners or angles of this structure are arranged the front wheels C—C, and the rear wheel C'. It is desirable to employ wheels of a relatively large diameter and to have the frame in as low horizontal planes as possible.

Each of the wheels is mounted in the manner shown in Figs. 3, 4, and 5. It is arranged in one of the spaces surrounded by the longitudinal bars 1 and the cross bars 2, 3, etc. 5 indicates a yoke frame formed of straight angle metal bent so as to provide the forward curved part 6, the side part 7 and the end parts 8. Upon this the axle 9 for the wheel is supported by means of the boxes 10. The bent bar or yoke 5 is pivoted at 11 to the frame. 12 is an elongated strong pivot rod passing through the flanges 13, 13 of the upper and lower cross bars 2, 2$^a$ of the frame. The wheels caster, or turn, around the axes of these pivot rods 12, and, therefore, the wheel frame, as an entirety, can freely and readily follow the lines of draft.

The front end and the rear ends of the yoke frame, or wheel frame, 5, bear upward against the main frame, the latter, because of its weight, exerting downward pressure upon the wheel frame. The rear ends of the wheel frame bars carry wheels or rollers 14, which are mounted upon pintle or shaft projections secured to or formed with blocks 15 that are bolted to the ends of the yoke. A track or bearing surface for these rollers is provided by means of plates or bars 16, which are secured to the under side of the frame and extend across the corners of the space in which the wheel is mounted, the track or bearing line of these rollers being concentric, of course, with the pivot at 12.

The anti-friction rollers 14, it will be seen, are mounted on axes which are radial or approximately radial to the axis around which the wheel frame swings, and therefore although made large and mounted upon relatively large pintles or shafts, are permitted to rotate freely and without cramping or binding. Again, these wheels or rollers are mounted in such way that there is no catching or lodging place below them for soil or trash. Any bodies of foreign material that should come in contact with the end parts of their pintles or shafts can readily drop downward so that there is little liability of its being crowded into the wearing surfaces.

I prefer to have these rollers 14 detachably secured, as they are subjected to great pressure and wear. As shown, they are secured upon their pintles or shafts by cotter keys and can be readily removed, and others can be substituted without dismantling any of the large elements of the machine. This can be provided for either by having the wheels supported upon strong trunnion-like pintles or shafts, each supported at one end only so that they will be entirely exposed for ready removal and replacing; or they can be mounted in any other way now well known, either permanently or detachably.

By having two wheels, one upon each side of the central longitudinal vertical plane of the caster wheel, an additional bracing effect is insured for the wheel frame and its forward pivot, but in this respect also there can be variation. Each wheel has but a narrow region, in fact, a single line, approximately, only of contact with the bearing face above it, and this insures that any foreign material that should be thrown up against the bearing surface shall be cut and dislodged and dropped through the open space below to the ground.

If the parts thus far described were depended on for carrying the wheel it would not be supported properly at all times, it being possible for the rear parts of the yoke to drop away from the frame when circumstances permit. To obviate this, and prevent the wheel from falling down under any circumstances, I have provided for it an elongated base of connection with the main frame. I combine with the main yoke 5 a supplementary yoke device or brace 17. This may be formed of strong wrought metal bent so as to have the horizontal arms 18, the upper approximately horizontal curved part 19 and the connecting parts 20. The arms 18 are bolted to the parts 7 of the yoke. The upper central part 19 is connected to the main frame at the axis of the wheel frame and adapted to swing around said axis, this being preferably accomplished by joining said part 19 to the upper part of the pivot bolt 12. The parts at 19 and 6 are so remote from each other that an elongated strong base of support at the pivot axis is provided for the wheel frame, and it is prevented from falling down if the surface of the ground should be such as to permit it, the rear end of the yoke wheel frame, or yoke frame, in this construction, having no downward engagement with the main frame such as would be provided by a bar or plate below the rollers 14.

I am aware that it has been common to brace and strengthen in various ways the parts of hinges or pivot mechanisms in mechanical structures other than gang plows. In some cases, in such other mechanisms, the pintle or journal element has been elongated and arranged to rock in a correspondingly elongated stationary bearing or stationary tubular element, the relative elongation giving the desired bracing effect to the part which swings. In other cases of hinged structures use is made of an elongated stationary pintle and a correspondingly elongated tubular bearing part joined to the swinging element and swinging with it, this bearing or tubular part being formed of one axially elongated piece, instead of being bifurcated or formed with two separate perforated bearings, similar to the one I have selected. Therefore I do not mean to be understood as claiming broadly a braced hinge structure having its essential parts extended along the axial line; but nevertheless believe myself to be the first to have reinforced a swinging caster wheel frame in a gang plow of this class drawn from a front vertical pivot, by causing this frame to bear upward against a main frame abutment and at the same time giving the forward pivot a relatively elongated, vertical axial connection with the main frame to which the wheel frame is attached, the main frame abutment being adapted to resist the heavy upward pressure of the rear part of the wheel frame, while the special construction of the pivotal connection adapts it to resist the lesser downward force due to the weight of the wheel and its frame. And it will be further understood that there can be variations in the details of structure incident to the bracing of the front horizontal connection, and incident to the parts where the main frame and the wheel frame bear against each other, without departing from the essential features of the invention.

The employment of the rollers 14 is a matter of great importance, as they permit the heavy wheel frame to readily accommodate itself to the lines of draft; and the present construction in this respect is superior to those of my earlier devising wherein I combine with the rear end of the wheel frame guards or holders having bars above and bars below the wheel frame, the latter holding it against downward displacement. The construction last referred to is shown and described in my co-pending application for plows, Serial No. 530,220, filed November 27, 1909, as a division of my earlier application for engine gang plows, Serial No. 465,875, filed December 3, 1908. As noted above, the rollers have no downward engagement with such bars or other part of the main frame. The dispensing with any such holder below the rollers insures that there shall be no clogging or obstructing of the rollers, as there can be no accumulation of foreign material in their path.

It will be seen that the swinging wheel frame is situated in horizontal planes which are low relatively to the horizontal plane of the wheel axis, the purpose being to relate the wrought metal bars of the frame to the other parts in such way that the draft from the pivot can be brought back as directly to the axle of the wheel as possible. The pivot rod 12 is itself brought low relative to the wheel axis, and, as is fully described herein, the rear end of the wheel frame and the parts attached thereto, receive the pressure of the main frame at points which are low. Of course it will be understood that there can be variations as concerns the precise locations of the axle 9, the draft bars 8, and the carriers or boxes 10, provided that the essential features of construction and relationship which characterize my construction are retained in respect to bringing the parts of the wheel frame to such relative positions that the draft shall be taken directly to the wheel axle and the latter shall be high relative to the main frame.

The main frame in a plow like that indicated is generally made of wrought metal beams, heavy and cumbersome, to transmit and withstand excessive strains. But, though heavy, these main frames should respond quickly to changes in travel necessitated by the engine. The plows should follow lines parallel to the furrows to insure uniform furrow slices and quick changing from a straight line is frequently required. This is also true in turning at the ends of furrows and in escaping obstructions or impediments. This main frame being very heavy it should be fixed in low horizontal planes, and its ground wheels should be large to roll easily over the varying ground. It has been proposed to support such wheels in castering brackets of cast metal. In some cases this proposal has been to use a cast bracket in a high horizontal plane near the top of the wheel (necessarily small) and to extend arms down to its axis. In other cases the wheel-carrier has been an ordinary curved caster iron of cast metal extending from the axis of the wheel upward and curved up to a pivot in front of and higher than the wheel. The wheel shown in the patent to Vaniman, 853,046, typifies the first kind of wheel supports; that in the patent to Wedlake, 926,306, illustrates the second class. I have found it impossible to support and guide the heavy beam frame upon castering devices of these earlier sorts, and accomplish my purpose. To meet and overcome the excessive strain of the draft on the wheel, I position the swinging wheel frame in low planes and also the main vertical hinge in front of the wheel, preferably bringing this hinge down, so that it intersects the horizontal plane of the wheel axis. Then, to provide quickness and delicacy in response of the wheel to the lateral swinging of the frame, I provide the antifriction rollers behind the wheel, and rest the main frame, (or some bar or plate carried thereby) directly on these wheels or rollers. The wheel frame itself I have formed of wrought metal bars, and place these as close to the horizontal plane of the wheel axis as practicable, and the draft from the pivot and its bearing is transmitted backward on horizontal lines near that plane. The best results are attained by having the rear antifriction rollers or wheels and the front pivot approximately equi-distant from the wheel axis.

On the front pivot and on the rear antifriction rollers or wheels the cumbersome, heavy metal frame rests and floats laterally as upon a saddle, all the bearing points being low down, near the ground. The wheel is one of long diameter to give the greatest ease in rolling on the ground, but because of the parts above described, and the adjunct parts, being constructed and arranged as above described the tendency of the stresses of the draft to throw the top of the wheel laterally is practically entirely overcome.

What I claim is:

1. The combination with a main plow frame or similar structure of a laterally swinging wheel, a wheel frame pivoted to the main frame on an axis in front of the wheel, and bearing upward against the main frame at points in rear of the wheel, and a brace for the wheel frame pivoted to the main frame on the same axis as is the wheel frame and adapted to swing around said axis with the wheel frame, substantially as set forth.

2. The combination with a main plow frame or similar structure of a laterally swinging wheel, a swinging frame carrying the wheel and pivoted to the main frame on an axis in front of the wheel, and a brace connected to the wheel frame and connected to the main frame pivotally on the said axis at points remote from the points of connection of the wheel frame with the main frame, substantially as set forth.

3. The combination of a main plow frame or similar structure, a laterally swinging wheel, a frame carrying said wheel pivoted to the main frame on an axis in front of the wheel and extending from said front axis to the axis of the wheel and then rearward to points behind the wheel and adapted to bear upward against the main frame at points to the rear of the wheel and having in its rear part no downward engagement with the main frame, and means for preventing the rear part of the wheel frame from falling away from the main frame.

4. The combination with a main plow frame or similar structure, of a laterally swinging wheel, a wheel frame, an elongated pivot connecting the wheel frame to the main frame, a brace interposed between the wheel frame and the pivot, and means for imparting downward pressure from the plow frame to the wheel frame at points remote from the pivot, substantially as set forth.

5. The combination with a main plow frame or similar structure, of a laterally swinging wheel, a frame in which the wheel is mounted arranged to have the main plow frame bear downwardly thereon at points in front of the wheel and at points in rear of the wheel, an elongated pivot connecting the wheel frame with the main frame, and a wheel frame brace engaging with the pivot, substantially as set forth.

6. The combination with a main plow frame or similar structure, of a laterally swinging wheel, a frame for the wheel, a relatively elongated pivot on the main frame with which the wheel frame engages, and a brace secured to the wheel frame and engaging with the pivot at points remote from the points of the wheel frame engagement therewith, the wheel frame being arranged to bear upwardly against the main frame and having no downward engagement therewith, substantially as set forth.

7. The combination with a main plow frame or similar structure, of a wheel, a laterally swinging frame for the wheel movably connected with the main frame at one side of the wheel and engaging with the main frame at the other side of the wheel, whereby it can move bodily laterally relatively to said main frame, and a laterally swinging brace for the wheel frame interposed between it and the main frame, substantially as set forth.

8. The combination of a main plow frame or similar structure, a laterally swinging wheel, and a frame carrying the said wheel pivotally connected at widely separated points in front of the wheel with the main frame and adapted to bear upward against the main frame at points in the rear of the wheel and having in its rear part no downward engagement with the main frame, the elongated pivotal connection between the main frame and the wheel frame being adapted to sustain the rear part of the wheel frame.

9. The combination of a main plow frame or similar structure, a laterally swinging wheel, a frame carrying said wheel, and pivotal connections in front of the wheel between the wheel frame and the main frame, the wheel frame being arranged to bear upward against the main frame at points in rear of the wheel and to have no downward engagement in its rear part with the main frame and the said pivotal connections between the wheel frame and the main frame having widely extended bearing contact, whereby the rear part of the wheel frame is sustained when the wheel is not supported from the ground.

10. In a plowing mechanism of the class described, the combination of a main frame formed of longitudinal beams and transverse beams rigidly secured to the longitudinal beams, a laterally swinging wheel frame arranged to have the main frame bear thereon at its front end and at its rear end, an elongated vertically arranged pivot for the wheel frame, a vertically elongated pivot bearing secured to a beam on the main frame, one or more anti-friction rollers on the rear end of the swinging frame at the points where the main frame bears upon it, and a ground wheel mounted in said frame with its axis in a relatively high horizontal plane and situated substantially midway between the said anti-friction rollers and the said vertical pivot, substantially as set forth.

11. In a plowing mechanism of the class described, the combination of a main frame formed of longitudinal beams and transverse beams rigidly secured together, a ground wheel of relatively large diameter extending upward across the horizontal planes of the frame, the swinging frame for said wheel formed of metal bars arranged in horizontal planes relatively near that of the wheel axis, the elongated vertical pivot for the wheel frame in front of the wheel and below the top thereof, and the rear rollers on the wheel frame behind the wheel, said parts being arranged substantially as set forth to have the main frame bear downward on the wheel frame in front of the wheel and to bear substantially similarly downward on the said rollers in the rear of the wheel at points relatively near the horizontal plane of the axis.

12. In a plowing mechanism of the class described, the combination of a main frame, a laterally swinging frame, a ground wheel mounted therein, an elongated vertical pivot for the swinging frame having its axis in front of the wheel, the bearing for the pivot situated relatively low near the horizontal plane of the wheel axis, said wheel frame extending from the said pivot backward on lines relatively near the horizontal plane of the said wheel axis, and one or more bearing rollers on the rear end of the said swinging frame on which the main frame rests at points near said plane and which are at a distance from the wheel axis approximately equal to the distance of the front pivot therefrom.

13. In a plowing mechanism of the class described, the combination of a main frame, a ground wheel, a laterally swinging frame surrounding the wheel and having its longitudinal bars and its end cross bars situated low relatively to the horizontal axis of the ground wheel, one or more bearing rollers or wheels on the rear end of the wheel frame, the main frame bearing downward on the wheel frame at points in front of the wheel and on the said bearing rollers at points relatively near the horizontal plane of the wheel axis, and a vertically elongated pivotal connection between the main frame and the wheel frame in front of the wheel and situated in or near the said plane.

14. In a plowing mechanism of the class described, the combination of a main frame, a frame supporting ground wheel, a laterally swinging frame for said wheel, a pivotal connection between the main frame and the wheel frame in front of the wheel and situated low relatively to the axis of the wheel, and a bearing roller or wheel mounted on the wheel frame behind the ground wheel and below the top thereof, the main frame bearing downward on the wheel frame in front of the wheel and bearing down on said roller behind the wheel at points near the horizontal plane of the wheel axis and the said pivotal connection between the frame having a vertically extended bearing contact whereby the main frame is sustained upon the wheel frame when the wheel is on the ground and the wheel frame is sustained when the wheel is not supported from the ground.

15. In a plowing mechanism of the class described, the combination of a main frame, a frame supporting ground wheel of relatively large diameter extending upward across the horizontal planes of the frame, a laterally swinging frame for said wheel, two anti-friction rollers at the rear end of said frame behind the wheel, one on each side of the central longitudinal vertical plane of the wheel, the main frame bearing down on said rollers behind the wheel and on said frame in front of the wheel, a vertical pivotal connection between the front end of the wheel frame and the main frame, and means at the front end of said frame for bracing it against falling at the rear end when the ground wheel is not supported by the ground, substantially as set forth.

16. In a plowing mechanism of the class described, the combination of a main frame, a ground wheel of relatively large diameter extending across the horizontal planes of the frame, a laterally swinging frame for said wheel having arms at the side thereof situated in horizontal lines relatively near the axis of the wheel, the said arms being connected together at their forward ends in front of the wheel, boxes or bearings for the wheel axis formed separately from the said bars and secured thereto, two anti-friction rollers mounted on the wheel frame, one on each side of the central vertical longitudinal plane of the wheel, and a pivot or hinging device at the front of the wheel joining the wheel frame and the main frame and having a male element and a counterpart female element both situated low relatively to the horizontal plane of the wheel axis, one secured to the main frame and the other secured to the wheel frame, substantially as set forth.

17. In a plowing mechanism of the class described, the combination of the main frame, a frame supporting ground wheel, a laterally swinging frame having arms extending backward by the sides, respectively, of the wheel in planes relatively near the wheel axis, one or more anti-friction rollers on the rear end of the swinging frame, the main frame bearing downward on said rollers and on the front part of the swinging frame, and a pivot device for the swinging frame comprising two stationary horizontal widely separated plates on the main frame, an elongated female element having its upper extremity adjacent to one of the stationary plates and its lower extremity adjacent to the lower stationary plate, and an elongated male pivot element connecting the upper and lower stationary plates to the said upper and lower extremities of the female element and all situated low relatively to the axis of the wheels, substantially as set forth.

18. In a plowing mechanism of the class described, the combination of the main frame, the laterally swinging wheel frame, a two-element pivot device connecting the frames, the first element being secured to the laterally swinging frame and having its upper and lower extremities relatively widely separated vertically, and the second element being a stationary holder for the first element, on the main frame, with its upper and lower extremities correspondingly widely separated, an anti-friction roller on the rear end of the swinging frame bearing upward against the main frame, and a ground wheel mounted on said laterally swinging frame behind the said pivot device with its axis in a horizontal plane which is high relatively to both the said pivot device and the main frame.

19. In a gang plow, the combination of a main frame, a laterally swinging caster wheel, a laterally swinging frame for said wheel, one or more anti-friction wheels or rollers mounted on horizontal pintles or shafts and arranged to take the vertical thrust of the main frame upon the wheel frame, a front vertical pivot connection for the wheel frame, and a bracing mechanism for the said front pivot connection, substantially as set forth.

In testimony whereof I affix my signature, in presence of two witnesses.

MAX SKLOVSKY.

Witnesses:
EUGENE L. TAYLOR,
ROY E. ANDERSON.